US006646784B2

(12) United States Patent
Leuthold

(10) Patent No.: US 6,646,784 B2
(45) Date of Patent: *Nov. 11, 2003

(54) OPTICAL WAVELENGTH CONVERTER

(75) Inventor: Juerg Leuthold, Eatontown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 267 days.

This patent is subject to a terminal disclaimer.

(21) Appl. No.: 09/809,401

(22) Filed: Mar. 15, 2001

(65) Prior Publication Data

US 2002/0003652 A1 Jan. 10, 2002

Related U.S. Application Data

(63) Continuation-in-part of application No. 09/611,572, filed on Jul. 7, 2000, now Pat. No. 6,437,905.

(51) Int. Cl.⁷ .......................... G02F 1/365; G02F 1/377
(52) U.S. Cl. ...................................... 359/332; 359/326
(58) Field of Search ................... 359/326–332; 385/122

(56) References Cited

U.S. PATENT DOCUMENTS

| 5,721,637 A | * | 2/1998 | Simon et al. ............... 359/344 |
| 6,256,137 B1 | * | 7/2001 | Hironishi ................... 359/332 |
| 6,282,015 B1 | * | 8/2001 | Ueno et al. ................ 359/332 |
| 6,323,992 B1 | * | 11/2001 | Ueno ........................ 359/332 |
| 6,437,905 B1 | * | 8/2002 | Joyner et al. ............... 359/332 |

FOREIGN PATENT DOCUMENTS

EP      0 875 782 A2     11/1998 ............. G02F/2/00

OTHER PUBLICATIONS

J. M. Weisenfeld, "Wavelength Conversion at 10 Gbit/s Using A Semiconductor Optical Amplifier", Photon Technol. Lett., 5, (11), pp 1300–1303, (Nov. 1993).
K. Tajima, All Optical Switch With Switch Off Time Unrestricted by Carrier Lifetime, Jpn. J. Appl. Phys., vol. 32, No. 12A, pp. L1746–L1749, Dec. 1993.
K. E. Stubkjaer et al, "Optical Wavelength Converters", Proc. European Conf. On Opt. Communications, Firence, Italy, vol. 2, pp 635–642, Sep. 1994.
J. M. Weisenfeld, "Wavelength Conversion for Optical Networks", Second Optoelectronic & Communications Conference (OECC'97), Technical Digest, pp. 426–427, Jul. 1997.
Y. Ueno et al, "3.8 THz Wavelength Conversion of Picosecond Pulses Using a Semiconductor Delayed–Interfrence Signal–Wavelength Converter (DISC)", Photon. Technol. Letters, vol. 10, No. 3, Mar. 1998, pp. 346–348.
J. Leuthold et al, "Compact and Fully Packaged Wavelength Converter With Integrated Delay Loop for 40 Gbit/s RZ Signals", Optical Fibert Communication Conference (OFC). Technical Digest Postconference Ed., Baltimore, MD, Mar. 7–10, 2000, NY, NY IEEE, US, vol. 4, pp 218–220.

(List continued on next page.)

Primary Examiner—John D. Lee
(74) Attorney, Agent, or Firm—Barry H. Freedman; David A. Sasso

(57) ABSTRACT

A wavelength converter with a monolithically integrated delay loop in a delayed interference configuration that needs only one SOA or other non-linear optical element coupled to the input fiber, a first coupler arranged to split the output of the SOA or other non-linear optical amplifying element into two paths having controllable delay and phase shift characteristics, and at least one output coupler to combine the signals present on the two paths to provide the converter output. One embodiment of the invention has a monolithically integrated delay loop utilizing one or more asymmetric couplers. Another embodiment of the invention has a coupler that does not require an asymmetric splitting ratio, and has either a gain element in one of the paths, an attenuation element in one of the paths, or both.

10 Claims, 4 Drawing Sheets

OTHER PUBLICATIONS

Y. Ueno et al, "Spectral Phase–Locking In Ultrafast All–Optical Mach–Zehnder–Type Semiconductor Wavelength Converters", Japanese Journal of Applied Physics, Publication Office Japanese Journal of Applied Physics, Tokyo, JP, vol. 38, No. 11A, Part 2, Nov. 1, 1999, pp L1243–L1246.

J. Leuthold et al, "Cascadable Dual–Order Mode All–Optical Switch With Integrated Data–and Control–Signal Separators", Electronics Letters, IEE Stevenage, GB, vol. 34, No. 16, Aug. 6, 1998, pp 1598–1600.

J. Leuthold et al, "a00 Gbit/s All–Optical Wavelength Conversion With Integrated SOA Delayed–Interference Configuration", Electronics Letters, IEE Stevenage, GB, vol 36, No. 13, Jun. 22, 2000, pp 1129–1130.

J. Leuthold et al, "All–Optical Mach–Zehnder Interferometer Wavelength Converters and Switches With Integrated Data–and Control–Signal Separation Scheme", Journal of Lightwave Technology, IEEE, NY, US, vol. 17, No. 6, Jun. 1999, pp 1056–1065.

* cited by examiner

OPTICAL WAVELENGTH CONVERTER

CROSS-REFERENCE TO RELATED APPLICATION

The present application is a continuation-in-part of U.S. patent application Ser. No. 09/611,572 filed on Jul. 7, 2000, by Charles H. Joyner and Juerg Leuthold, entitled "Optical Wavelength Converter," now U.S. Pat. No. 6,437,905.

FIELD OF THE INVENTION

This invention relates generally to the field of optical communications and in particular to a method and apparatus for providing optical wavelength conversion employing cross phase modulation (XPM).

BACKGROUND OF THE INVENTION

All optical wavelength converters which operate at speeds beyond the limits of electronic devices will be essential components in future Wavelength-Division-Multiplexed (WDM) networks. As was shown in a paper entitled "Wavelength Conversion at 10 GBit/s Using a Semiconductor Optical Amplifier" which appeared in Photon Technol. Lett., 5, (11), pp. 1300–1303, (1993), J. M. Weisenfeld demonstrated all optical wavelength conversion using semiconductor optical amplifier (SOA) devices exploiting cross gain modulation (XGM) as well as cross phase modulation (XPM). As shown therein, in the XGM scheme a strong input signal and a continuous wave (cw) signal are introduced into a nonlinear element. The input signal is used to saturate the gain of the nonlinear element and thereby modulates the cw signal carrying the new wavelength. In the XPM scheme, a strong input signal is used to modulate both the phase and intensity of a second signal. The modulation of this second signal is then exploited in an interferometric configuration for redirecting the signal from one output to an other.

Different interferometric configurations have been proposed. Some are based on Michaelson (MI), others are based on Mach-Zehnder interferometer (MZI) configurations with the nonlinear elements on one or both branches of the interferometer arms. (See, e.g., K. Tajima, "All Optical Switch with Switch Off Time Unrestricted by Carrier Lifetime:; Jpn. J. Appl, Phys. Vol., 32, No. 12A, pp. L1746–1749; Dec. 1993; K. E. Stubkjaer, T. Durhuus, B. Mikkelsen, C. Joergensen, R. J. Pedersen, C. Braagaard, M. Vaa, S. L. Danielsen, P. Doussiere, G. Garabedian, C. Graver, A. Jourdan, J. Jacquet, D. Leclerc, M. Erman, and M. Klenk, "Optical Wavelength Converters"; Proc. European Conf. on Opt. Communication, Firence, Italy, Vol., 2, 635–642, Sept. 1994; J. M. Weisenfeld, "Wavelength Conversion for Optical Networks", Second Optoelectronic & Communications Conference (OECC'97), Technical Digest, pp. 426–427, July 1997. Recent developments include hybrid wavelength converters, using only a single SOA followed by a delay-interference section, formed by a calcite crystal. (See, Y. Ueno, S. Nakamura, K. Tajima, S. Kitamura", "3.8 THz Wavelength Conversion of Picosecond Pulses Using a Semiconductor Delayed-Interference Signal-Wavelength Converter (DISC)", Photon. Technol. Letters, Vol., 10, No. 3, March 1998; Y. Ueno, K. Tajima, "Wavelength Converter", EP 0 875 782 A2.

Despite these advances however, these delay interference wavelength converter schemes is hybrid in nature and their operation is fairly limited.

SUMMARY OF THE INVENTION

We have developed an integrated wavelength converter with a monolithically integrated delay loop in a delayed interference configuration that needs only one SOA or other non-linear optical element coupled to the input fiber, a first coupler to arranged to split the output of the SOA or other non-linear optical element (i.e., an element that changes its material property, such as, for example, refractive index, absorption or gain, in the presence of a strong light signal) into two paths having controllable delay and phase shift characteristics, and at least one output coupler to combine the signals present on the two paths to provide the converter output. Unlike prior-art hybrid wavelength converters, one embodiment of our inventive device has a monolithically integrated delay loop utilizing a coupler that has an asymmetric splitting ratio. The asymmetric coupler can be either the first coupler or the second coupler, or both. The non-linear optical element can, in addition to a semiconductor optical amplifier, be, for example, an electro-absorption modulator, a DFB laser, a gain clamped semiconductor optical amplifier, etc.

Another embodiment of our invention has a coupler that does not require an asymmetric splitting ratio, and has either a gain element in one or both paths, an attenuation element in one or both paths, or the two in one or both paths.

If desired, yet another coupler can be added to the wavelength converter to couple out part of the light in one or both of the paths, thereby obtaining a better extinction ratio.

DETAILED DESCRIPTION OF THE INVENTION

Figure 1:
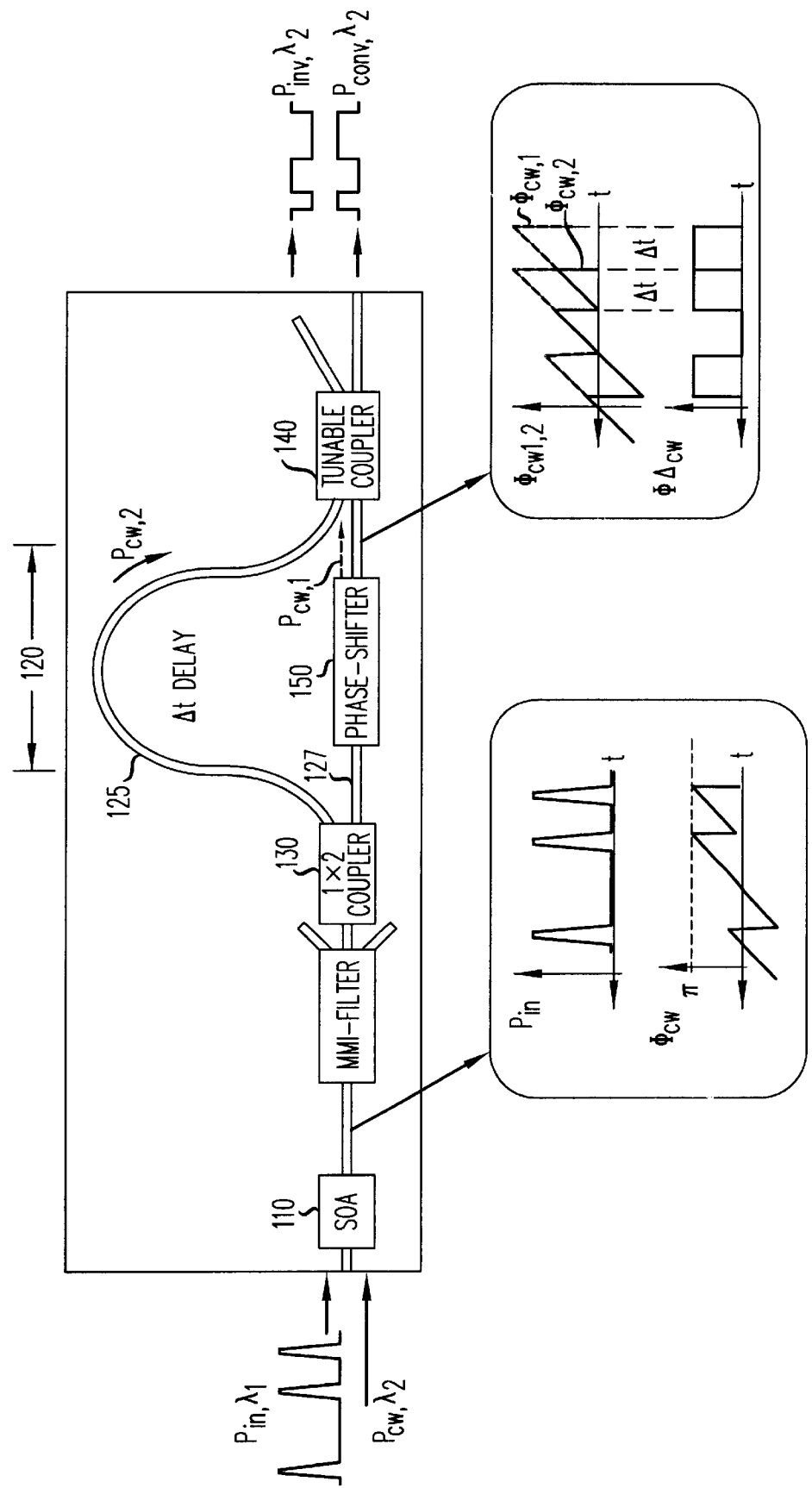
FIG. 1 is a schematic drawing illustrating one embodiment of our inventive wavelength converter.

With reference to FIG. 1, there is shown in schematic form a diagram depicting one embodiment of our inventive optical wavelength converter 100. It includes a semiconductor optical amplifier (SOA) 110 monolithically integrated with a delayed interference loop 120 which may be formed by a tunable or fixed, but asymmetric splitting ratio coupler 130 and a coupler 140, e.g., a 2×2 or 1×2 coupler. As can be readily appreciated by those skilled in the art, a longer arm 125 of the delayed interference loop 120 provides a Δt delay and shorter arm 127 of the delay interference loop 120 includes a phase shifter 150.

The device converts and reshapes a pulsed return-to-zero (RZ) input signal Pin at $\lambda 1$ into a wavelength converted signal Pconv at $\lambda 2$. The input signal Pin modulates the phase and the gain of co-propagating cw signal Pcw in the SOA. The rise time of the phases shift in the Pcw signal is almost instantaneous and limited by the pulse width of the Pin signal, whereas the fall time is limited by the slower, carrier recovery time. The power of an input pulse is chosen such that it modulates the phase of the cw signal by an amount of approximately +/−π or less. Upon exiting the SOA, the Pcw signal is asymmetrically split between the longer arm 125 and the shorter arm 127 of the delayed interference loop 120 through the action of the asymmetric splitting ratio coupler 130. After traversing the respective arms of the interference loop 120, the signals are combined by coupler 140. The coupler 140 directs the Pcw signal into a Pinv output port if the two signals in the two arms of the interference loop have a predetermined phase relation (additional phase-shifters on one or both of the arm can be used to provide the necessary offset phase shifts to obtain this predetermined phase relation), whereas it couples the signal into the Pconv output if an additional phase-shift of approximately π or less is induced. The signal traversing the shorter arm 127 of the delay interference loop 120 carries the ~π phase shift first reaches the coupler 140, and opens a "switching window" for the Pconv output port. At approximately Δt=10 ps later, the Pcw signal reaches the coupler 140, the phase difference is reset and the switching window in the Pconv port closes. In an exemplary situation, (100 Gbit/s), the bits are introduced in intervals of 10 ps. Because the delay at 10 ps equals the bit period of 100 Gbit/s, a NRZ format output is generated. By choosing a lower bit rate or a smaller delay loop, a RZ format output can be obtained with the same device.

In an exemplary construction, InGaAsP/InP wavelength converters may be grown by conventional Metal Organic Vapor Phase Epitaxy on (001) InP. The separate confinement heterostructure SOAs, having a length of approximately 1.2 mm may be grown first. Subsequently, the spotsize converters and passive waveguide layers are regrown using a butt coupling scheme to connect the two different layers in the same plane. Waveguides, couplers and phase shifters are defined by a wet etching step. The radius of the curved waveguides is substantially 250 μm and the total waveguide losses are below 3 dB. A doped, InGaAs layer is grown on top of the active SOA sections and phase-shifter sections to provide ohmic contacts. A representative size of such a packaging construction is approximately 6×1.3 mm. Subsequently, input and output ports may be fiber-pigtailed and the integrated device so constructed may be mounted with a temperature cooling unit into an additional (i.e., "butterfly") package.

For device characterization, RZ input data signals $P_{in}$ were generated at a pseudo random bit sequence (PRBS) of $2^{31}$ −1 at 100 Gbit/s. The input signals exhibited a FWHM of ~3 ps and an average power of 8 dBm in the device and were chosen at a wavelength of $\lambda_1$=1.546 μm. A cw signal $P_{cw}$ at $\lambda_2$=1.560 μm carrying the new wavelength was externally combined with the input signal and introduced into the input port. The phase shifter and the integrated tunable coupler were set such that the bit inverted and wavelength converted signal was directed to the output port. With SOAs as the nonlinear medium, the bit inverted signals are more advantageous for high speed operation, since they contain all the signal pulse energy, whereas the non-inverted pulses are suppressed by the cross-gain modulation (XGM) that inevitably goes along with the cross-phase modulation (XPM).

Figure 2A:
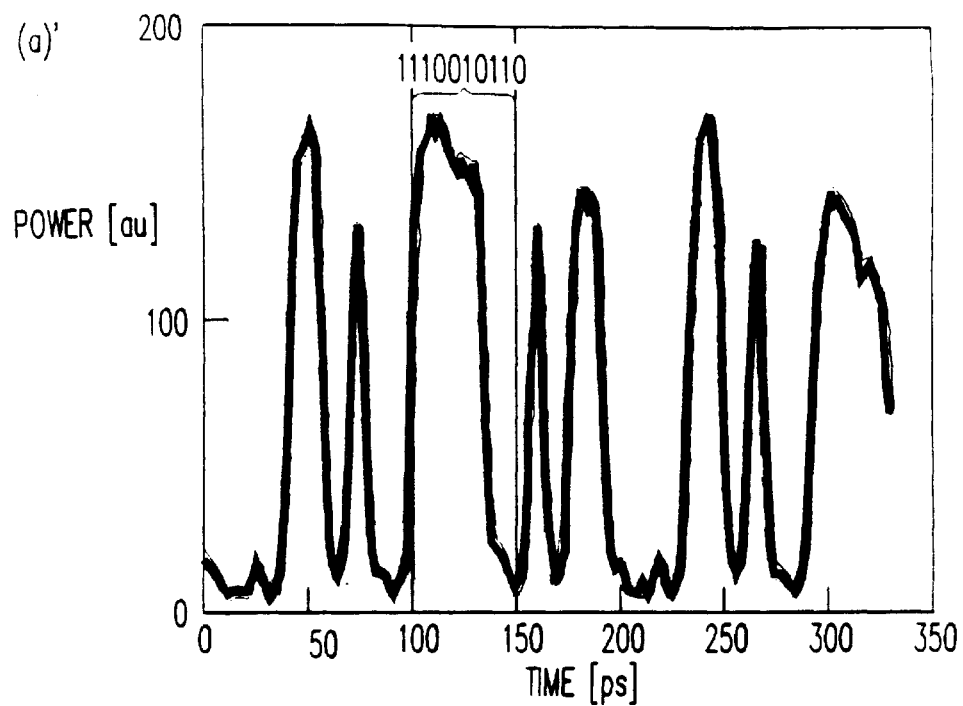
FIG. 2(a) is a graph depicting time resolved output power as measured with a streak camera demonstrating the high extinction ratios and good quality of signals converted by the device of FIG. 1.
Figure 2B:
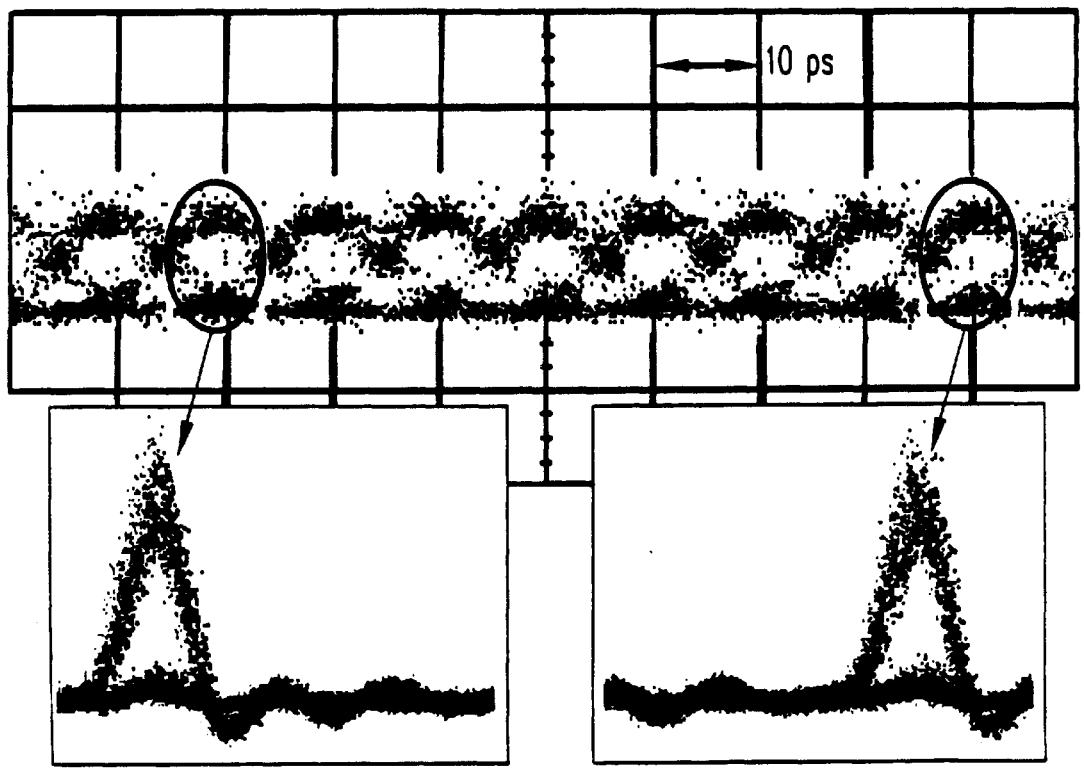
FIG. 2(b) is an eye diagram of a 100 Gbit/s signal as measured with a 50 GHz bandwidth photodiode.

A streak camera picture of the bit inverted and wavelength converted signal is depicted in FIG. 2(*a*). Extinction rations larger than 13 dB, as enabled by the integrated phase shifter and tunable coupler, are visible. Both the leading and trailing pulse transients are steep. FIG. 2(*b*) shows eye diagrams of the 100 Gbit/s signal as recorded with a 50 GHz bandwidth photodiode. The eye diagrams of the second and ninth demultiplexed signals are shown as an example in the lower left and right inset of FIG. 2(*b*).

Figure 3:
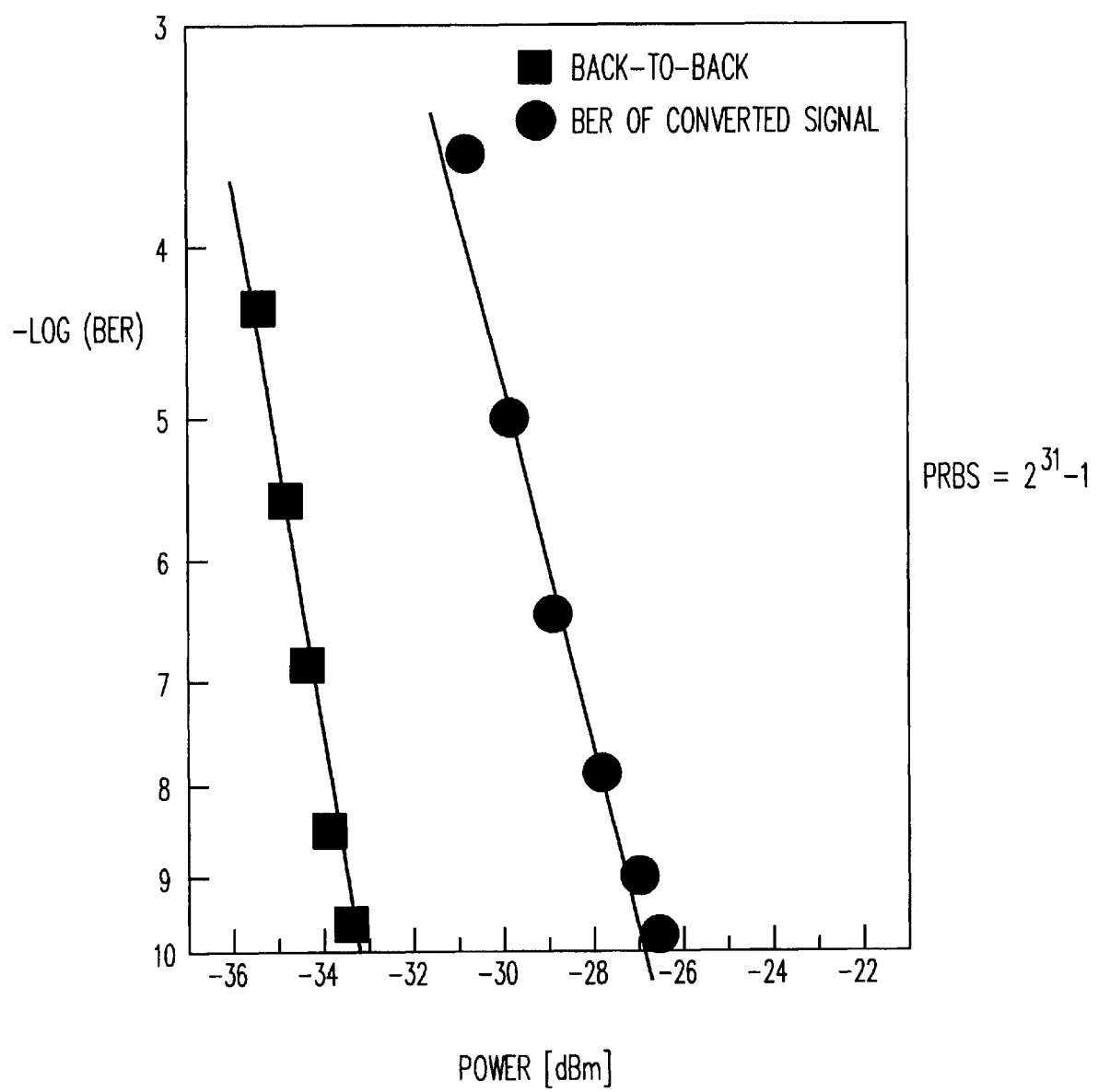
FIG. 3 is a graph showing measured BER of 100 Gbit/s wavelength converted signal vs. received preamplified input power.

Finally, the bit error rate (BER) performance is shown in FIG. 3. The BER of the converted 100 Gbit/s signal was measured after demultiplexing back to 10 Gbit/s and feeding this signal to an optically pre-amplified pin receiver. Thus, the received power is measured for 10 Gbit/s.

Figure 4:
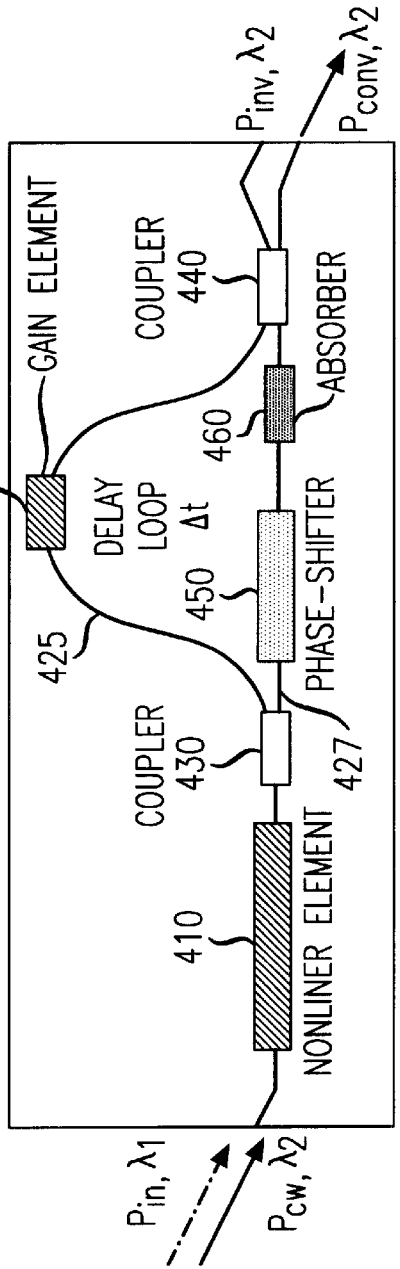
FIG. 4 is a schematic drawing illustrating another embodiment of our inventive wavelength converter in which a gain element and/or an attenuation element is used.

Referring now to FIG. 4, there is shown a schematic drawing illustrating another embodiment of our inventive wavelength converter in which a gain element and/or an attenuation element is used. In FIG. 4, non-linear element 410 performs the amplification function of SOA 110 of FIG. 1. The output of non-linear element 410 is applied to a coupler 430, which does not have to be asymmetric (as in the embodiment of FIG. 1), and which splits the signal into two paths, namely a first path 425 and a second path 427. Path 425 includes disposed therein a gain element 470, which can be a semiconductor optical amplifier, an optically pumped material, etc. Path 427 optionally includes a phase shifter 450, which corresponds to phase shifter 150 of FIG. 1, as well as an attenuation element 460, which can be an absorber or a radiating part of the waveguide, etc. Both the phase-shifter and/or the attenuator may be placed in one or the other, or both of the arms. The outputs of gain element 470 and attenuation element 460 are combined in a symmetric, asymmetric or tunable coupler 440, which, as a practical matter, can be a two by two coupler having complementary outputs, one of which is useful. The amount of gain provided by gain element 470 and the amount of attenuation provided by attenuation element 460 are advantageously adjusted, taking account of the characteristics of coupler 440, so that the extinction ratio of the output signal is optimized. For example, if coupler 440 is symmetric, then the gain provided by gain element 470 and/or the amount of attenuation provided by attenuation element 460 are adjusted so that the levels on the individual inputs to coupler 440 are essentially equal.

Note here that while FIG. 4 depicts the use of both a gain element 470 and an attenuation element 460, it is contemplated that the present invention may be arranged to use one or the other, as well as to use both. A clever combination of gain and attenuation elements might even be useful to eliminate additional phase-shifters on one or both arms.

Figure 5:
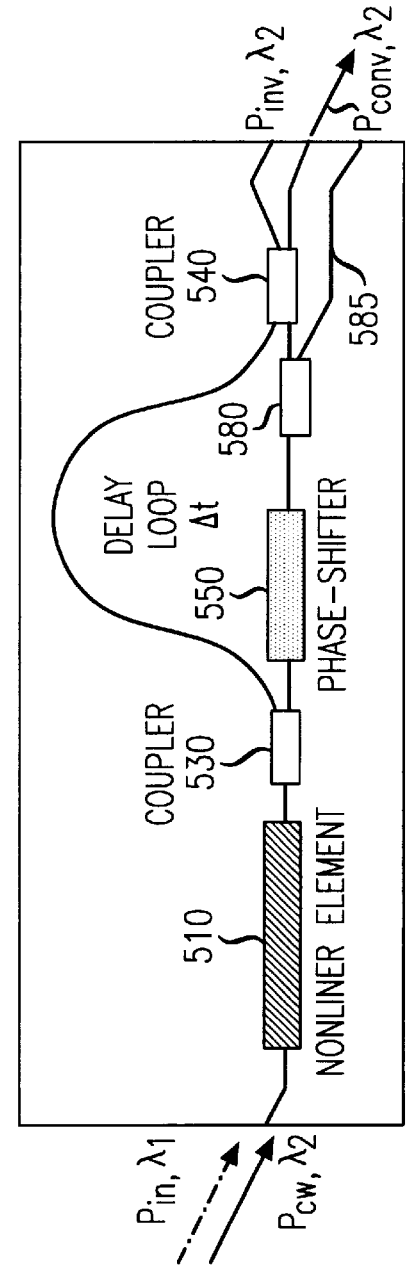
FIG. 5 is a schematic drawing illustrating yet another embodiment of our inventive wavelength converter in which an additional coupler is added to the wavelength converter.

FIG. 5 is a schematic drawing illustrating yet another embodiment of our inventive wavelength converter in which an additional coupler is added to the wavelength converter. In this embodiment, the elements are similar to those shown in FIG. 1, except that a non-linear element 510 is used in lieu of SOA 110. In this embodiment, the outputs of symmetric, asymmetric or tunable splitting ratio coupler 530 are applied to a first path having a delay loop and to a second path optionally including a phase shifter 550 or one, the other or both of the arms. An additional coupler 580 is interposed in the second path, to remove a desired portion of light from the second path. This is done to adapt the signal intensities on the two interferometer arms in order to obtain good extinction ratios. The symmetric, asymmetric or tunable splitting ratio coupler 540 serves the same purpose as coupler 140 of FIG. 1, i.e. it combines the light from the first and second paths, and makes the converted signal available Note that the additional coupler can be placed in either or both of the first and/or second paths.

Various additional modifications of this invention will occur to those skilled in the art. Nevertheless, all deviations from the specific teachings of this specification that basically rely upon the principles and their equivalents through which the art has been advanced are properly considered within the scope of the invention as described and claimed.

What is claimed is:

1. A wavelength converter comprising:

a semiconductor optical amplifier (SOA);

an input coupler, in optical communication with the SOA;

a delay loop, in optical communication with the input coupler; and an output coupler, in optical communication with the delay loop, wherein one or both of the input and output couplers have an asymmetric splitting ratio.

2. The wavelength converter according to claim 1 wherein said delay loop includes a short arm and a long arm, providing short and long optical paths respectively through the delay loop.

3. The wavelength converter according to claim 2 wherein the short arm, the long or both of the delay loop arms has a phase shifter included therein.

4. The wavelength converter according to claim 2 or 3 further comprising:

a filter, interposed between and in optical communication with the SOA and the input coupler.

5. The wavelength converter according to claim 2 or 3 wherein the SOA, the input coupler, the delay loop and the output coupler are monolithically integrated onto a common substrate.

6. The wavelength converter according to claim 5 wherein the input coupler is a multimode interference (MMI) coupler.

7. A wavelength converter comprising:

a non-linear optical element;

a first coupler arranged to receive an optical communication signal from the nonlinear element and to provide first and second outputs;

a delay loop, in optical communication with the first output of the first coupler; and a second coupler, in optical communication with (a) the delay loop and (b) the second output of said first coupler, wherein one or the other of said first and second couplers, or both, are asymmetric couplers.

8. A wavelength converter comprising:

a non-linear optical element;

a first coupler optically connected to the non-linear optical element;

first and second optical paths in optical communication with the first coupler, said first path arranged to delay optical signals with respect to optical signals in said second path;

means in one or both of said first and second paths to adjust the gain and/or attenuation of optical signals; and a second coupler, in optical communication with said first and second paths, for providing the output of said wavelength converter.

9. The invention defined in claim 8 wherein said wavelength converter further includes a third coupler for removing a portion of the optical signal present in one of said paths.

10. A wavelength converter comprising:

a non-linear optical element for receiving an input optical signal;

a first coupler optically connected to the non-linear optical element, said first coupler arranged to direct a portion of the output of said non-linear optical element onto first and second optical paths;

means in said first path arranged to delay optical signals with respect to optical signals in said second path;

means in said first or second path to adjust the gain and/or phase shift of optical signals that traverse said paths;

a second coupler for removing a portion of the optical signal present in one of said paths, and a third coupler, in optical communication with said first and second paths, for providing the output of said wavelength converter.

* * * * *